United States Patent
Meiri et al.

(10) Patent No.: US 10,719,249 B1
(45) Date of Patent: *Jul. 21, 2020

(54) EXTENT LOCK RESOLUTION IN ACTIVE/ACTIVE REPLICATION

(71) Applicant: EMC IP Holding Company LLC, Hopkinton, MA (US)

(72) Inventors: David Meiri, Somerville, MA (US); Xiangping Chen, Sherborn, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/263,414

(22) Filed: Jan. 31, 2019

(51) Int. Cl.
| | |
|---|---|
| G06F 13/00 | (2006.01) |
| G06F 3/06 | (2006.01) |
| G06F 9/52 | (2006.01) |
| G06F 16/176 | (2019.01) |

(52) U.S. Cl.
CPC ............ *G06F 3/0637* (2013.01); *G06F 3/061* (2013.01); *G06F 3/065* (2013.01); *G06F 3/067* (2013.01); *G06F 3/0622* (2013.01); *G06F 3/0659* (2013.01); *G06F 9/526* (2013.01); *G06F 16/1774* (2019.01)

(58) Field of Classification Search
CPC ...... G06F 3/0637; G06F 3/0622; G06F 9/526; G06F 3/065; G06F 3/0659; G06F 16/1774; G06F 3/061; G06F 3/067
See application file for complete search history.

(56) References Cited

U.S. PATENT DOCUMENTS

| | | | | |
|---|---|---|---|---|
| 5,913,213 | A | * | 6/1999 | Wikstrom ................ G06F 9/52 707/610 |
| 6,253,274 | B1 | * | 6/2001 | Boonie ..................... G06F 9/52 707/999.008 |
| 6,496,908 | B1 | | 12/2002 | Kamvysselis et al. |
| 6,553,464 | B1 | | 4/2003 | Kamvysselis et al. |
| 6,640,280 | B1 | | 10/2003 | Kamvysselis et al. |
| 6,862,632 | B1 | | 3/2005 | Halstead et al. |
| 6,883,018 | B1 | | 4/2005 | Meiri et al. |
| 6,886,164 | B2 | | 4/2005 | Meiri |

(Continued)

OTHER PUBLICATIONS

U.S. Appl. No. 16/264,825, Feb. 1, 2019, Chen et al.
(Continued)

*Primary Examiner* — Jing-Yih Shyu
(74) *Attorney, Agent, or Firm* — Daly, Crowley Mofford & Durkee, LLP

(57) ABSTRACT

In one aspect, extent lock resolution for storage devices includes designating one of the storage devices as a lock winner, which takes priority over another storage device over a lock. An aspect also includes receiving a replication request issued, by a host during active/active replication, determining an extent of pages to be modified by the request, locking the extent in local storage device, and executing the request at the local device. An aspect also includes sending a write request to a remote device. If the remote device is the designated lock winner, and an attempt to lock the extent is unsuccessful, the remote device waits for the lock to become available. If the remote device is not the designated lock winner, and an attempt to lock the extent is unsuccessful, the remote device rejects the write request and sends a request to the local device to resend the write request.

20 Claims, 7 Drawing Sheets

(56) References Cited

U.S. PATENT DOCUMENTS

| | | |
|---|---|---|
| 6,898,685 B2 | 5/2005 | Meiri et al. |
| 6,910,075 B2 | 6/2005 | Marshak et al. |
| 6,938,122 B2 | 8/2005 | Meiri et al. |
| 6,944,726 B2 | 9/2005 | Yoder et al. |
| 6,968,369 B2 | 11/2005 | Veprinsky et al. |
| 6,976,139 B2 | 12/2005 | Halstead et al. |
| 7,000,086 B2 | 2/2006 | Meiri et al. |
| 7,024,525 B2 | 4/2006 | Yoder et al. |
| 7,032,228 B1 | 4/2006 | McGillis et al. |
| 7,051,176 B2 | 5/2006 | Meiri et al. |
| 7,054,883 B2 | 5/2006 | Meiri et al. |
| 7,113,945 B1 | 9/2006 | Moreshet et al. |
| 7,114,033 B2 | 9/2006 | Longinov et al. |
| 7,174,423 B2 | 2/2007 | Meiri et al. |
| 7,197,616 B2 | 3/2007 | Meiri et al. |
| 7,228,456 B2 | 6/2007 | Lecrone et al. |
| 7,240,116 B2 | 7/2007 | Marshak et al. |
| 7,292,969 B1 | 11/2007 | Aharoni et al. |
| 7,376,651 B2 | 5/2008 | Moreshet et al. |
| 7,380,082 B2 | 5/2008 | Meiri et al. |
| 7,383,385 B2 | 6/2008 | Meiri et al. |
| 7,383,408 B2 | 6/2008 | Meiri et al. |
| 7,386,668 B2 | 6/2008 | Longinov et al. |
| 7,392,360 B1 | 6/2008 | Aharoni et al. |
| 7,409,470 B2 | 8/2008 | Halstead et al. |
| 7,430,589 B2 | 9/2008 | Veprinsky et al. |
| 7,475,124 B2 | 1/2009 | Jiang et al. |
| 7,577,957 B1 | 8/2009 | Kamvysselis et al. |
| 7,613,890 B1 | 11/2009 | Meiri |
| 7,617,372 B1 | 11/2009 | Bjornsson et al. |
| 7,702,871 B1 | 4/2010 | Arnon et al. |
| 7,870,195 B1 | 1/2011 | Meiri |
| 8,046,545 B2 | 10/2011 | Meiri et al. |
| 8,078,813 B2 | 12/2011 | LeCrone et al. |
| 8,327,103 B1 | 12/2012 | Can et al. |
| 8,332,687 B1 | 12/2012 | Natanzon et al. |
| 8,335,771 B1 | 12/2012 | Natanzon et al. |
| 8,335,899 B1 | 12/2012 | Meiri et al. |
| 8,380,928 B1 | 2/2013 | Chen et al. |
| 8,429,346 B1 | 4/2013 | Chen et al. |
| 8,468,180 B1 | 6/2013 | Meiri et al. |
| 8,515,911 B1 | 8/2013 | Zhou et al. |
| 8,539,148 B1 | 9/2013 | Chen et al. |
| 8,566,483 B1 | 10/2013 | Chen et al. |
| 8,578,204 B1 | 11/2013 | Ortenberg et al. |
| 8,583,607 B1 | 11/2013 | Chen et al. |
| 8,600,943 B1 | 12/2013 | Fitzgerald et al. |
| 8,677,087 B2 | 3/2014 | Meiri et al. |
| 8,683,153 B1 | 3/2014 | Long et al. |
| 8,694,700 B1 | 4/2014 | Natanzon et al. |
| 8,706,959 B1 | 4/2014 | Arnon et al. |
| 8,712,976 B1 | 4/2014 | Chen et al. |
| 8,719,497 B1 | 5/2014 | Don et al. |
| 8,732,124 B1 | 5/2014 | Arnon et al. |
| 8,775,388 B1 | 7/2014 | Chen et al. |
| 8,782,324 B1 | 7/2014 | Chen et al. |
| 8,782,357 B2 | 7/2014 | Halstead et al. |
| 8,799,601 B1* | 8/2014 | Chen .................. G06F 3/0608 711/161 |
| 8,812,595 B2 | 8/2014 | Meiri et al. |
| 8,825,964 B1 | 9/2014 | Sopka et al. |
| 8,838,849 B1 | 9/2014 | Meiri et al. |
| 8,862,546 B1 | 10/2014 | Natanzon et al. |
| 8,909,887 B1* | 12/2014 | Armangau ............ G06F 3/0643 707/693 |
| 8,914,596 B2 | 12/2014 | Lecrone et al. |
| 8,930,746 B1 | 1/2015 | Chen et al. |
| 8,954,699 B1 | 2/2015 | Chen et al. |
| 8,966,211 B1 | 2/2015 | Arnon et al. |
| 8,977,812 B1 | 3/2015 | Chen et al. |
| 8,977,826 B1 | 3/2015 | Meiri et al. |
| 9,002,904 B1 | 4/2015 | Meiri et al. |
| 9,009,437 B1 | 4/2015 | Bjornsson et al. |
| 9,026,492 B1 | 5/2015 | Shorey et al. |
| 9,026,696 B1 | 5/2015 | Natanzon et al. |
| 9,037,816 B1 | 5/2015 | Halstead et al. |
| 9,037,822 B1 | 5/2015 | Meiri et al. |
| 9,100,343 B1 | 8/2015 | Riordan et al. |
| 9,110,693 B1 | 8/2015 | Meiri et al. |
| 9,152,336 B1 | 10/2015 | Chen et al. |
| 9,304,889 B1 | 4/2016 | Chen et al. |
| 9,323,750 B2 | 4/2016 | Natanzon et al. |
| 9,342,465 B1 | 5/2016 | Meiri |
| 9,355,112 B1* | 5/2016 | Armangau .......... G06F 16/1774 |
| 9,378,106 B1 | 6/2016 | Ben-Moshe et al. |
| 9,384,206 B1 | 7/2016 | Bono et al. |
| 9,395,937 B1 | 7/2016 | Si et al. |
| 9,396,243 B1 | 7/2016 | Halevi et al. |
| 9,418,131 B1 | 8/2016 | Halevi et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,483,355 B1 | 11/2016 | Meiri et al. |
| 9,513,814 B1 | 12/2016 | Can et al. |
| 9,524,220 B1 | 12/2016 | Veprinsky et al. |
| 9,529,545 B1 | 12/2016 | Bono et al. |
| 9,542,125 B1 | 1/2017 | Chen |
| 9,558,083 B2 | 1/2017 | LeCrone et al. |
| 9,594,514 B1 | 3/2017 | Bono et al. |
| 9,606,739 B1 | 3/2017 | LeCrone et al. |
| 9,606,870 B1 | 3/2017 | Meiri et al. |
| 9,684,593 B1 | 6/2017 | Chen et al. |
| 9,710,187 B1 | 7/2017 | Si et al. |
| 9,753,663 B1 | 9/2017 | LeCrone et al. |
| 9,811,288 B1 | 11/2017 | Chen et al. |
| 9,817,766 B1 | 11/2017 | Si et al. |
| 9,933,947 B1* | 4/2018 | Vokaliga ............. G06F 12/0802 |
| 9,959,063 B1 | 5/2018 | Meiri et al. |
| 9,959,073 B1 | 5/2018 | Meiri |
| 10,007,466 B1 | 6/2018 | Meiri et al. |
| 10,025,843 B1 | 7/2018 | Meiri et al. |
| 10,037,369 B1 | 7/2018 | Bono et al. |
| 10,055,161 B1 | 8/2018 | Meiri et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,152,527 B1 | 12/2018 | Meiri et al. |
| 10,176,046 B1 | 1/2019 | Hu et al. |
| 10,235,066 B1 | 3/2019 | Chen et al. |
| 10,417,056 B2* | 9/2019 | Dice ....................... G06F 9/526 |
| 2008/0288811 A1* | 11/2008 | Sudhakar ............... G06F 16/10 714/4.11 |
| 2009/0265352 A1* | 10/2009 | Holenstein .......... G06F 16/2336 |
| 2010/0191884 A1* | 7/2010 | Holenstein .......... G06F 11/2094 710/200 |
| 2011/0137879 A1* | 6/2011 | Dubey ................ G06F 16/1774 707/704 |
| 2017/0039094 A1* | 2/2017 | Dice ....................... G06F 9/526 |
| 2017/0193070 A1* | 7/2017 | Miller ................ G06F 16/2343 |

OTHER PUBLICATIONS

U.S. Appl. No. 16/050,247, Jul. 31, 2018, Schneider et al.
U.S. Appl. No. 16/177,782, Nov. 1, 2018, Hu et al.
U.S. Appl. No. 15/001,789, Jan. 20, 2016, Meiri et al.
U.S. Appl. No. 15/076,775, Mar. 22, 2016, Chen et al.
U.S. Appl. No. 15/076,946, Mar. 22, 2016, Meiri.
U.S. Appl. No. 15/085,188, Mar. 30, 2016, Meiri et al.
U.S. Appl. No. 15/499,297, Apr. 27, 2017, Kucherov et al.
U.S. Appl. No. 15/499,303, Apr. 27, 2017, Kucherov et al.
U.S. Appl. No. 15/499,226, Apr. 27, 2017, Meiri et al.
U.S. Appl. No. 15/499,199, Apr. 27, 2017, Stronge et al.
U.S. Appl. No. 15/797,329, Oct. 30, 2017, Parasnis et al.
U.S. Appl. No. 15/971,153, May 4, 2018, Meiri et al.
U.S. Appl. No. 15/971,310, May 4, 2018, Kucherov et al.
U.S. Appl. No. 15/971,325, May 4, 2018, Kucherov et al.
U.S. Appl. No. 15/971,445, May 4, 2018, Kucherov et al.
U.S. Appl. No. 16/048,767, Jul. 30, 2018, Chen et al.
U.S. Appl. No. 16/169,202, Oct. 24, 2018, Chen et al.
U.S. Appl. No. 16/167,858, Oct. 23, 2018, Chen et al.
U.S. Appl. No. 16/175,979, Oct. 31, 2018, Hu et al.

(56) References Cited

OTHER PUBLICATIONS

U.S. Appl. No. 16/157,528, Oct. 11, 2018, Chen et al.
U.S. Appl. No. 16/162,786, Oct. 17, 2018, Hu et al.
U.S. Appl. No. 16/164,005, Oct. 18, 2018, Chen et al.
U.S. Appl. No. 16/254,899, Jan. 23, 2019, Chen et al.
U.S. Appl. No. 16/254,897, Jan. 23, 2019, Chen et al.
U.S. Appl. No. 16/264,982, Feb. 1, 2019, Chen et al.
U.S. Appl. No. 15/499,943, Apr. 28, 2017, Kucherov et al.
U.S. Appl. No. 15/499,935, Apr. 28, 2017, Chen et al.
U.S. Appl. No. 15/499,949, Apr. 28, 2017, Chen et al.
U.S. Appl. No. 15/499,947, Apr. 28, 2017, Kucherov et al.
U.S. Appl. No. 15/499,951, Apr. 28, 2017, Chen et al.
U.S. Appl. No. 15/656,168, Jul. 21, 2017, Hu et al.
U.S. Appl. No. 15/656,170, Jul. 21, 2017, Chen et al.
U.S. Appl. No. 15/797,324, Oct. 30, 2017, Chen et al.
U.S. Appl. No. 15/885,027, Jan. 31, 2018, Chen et al.
U.S. Appl. No. 16/042,363, Jul. 23, 2018, Chen et al.
U.S. Appl. No. 16/038,543, Jul. 18, 2018, Chen et al.

* cited by examiner

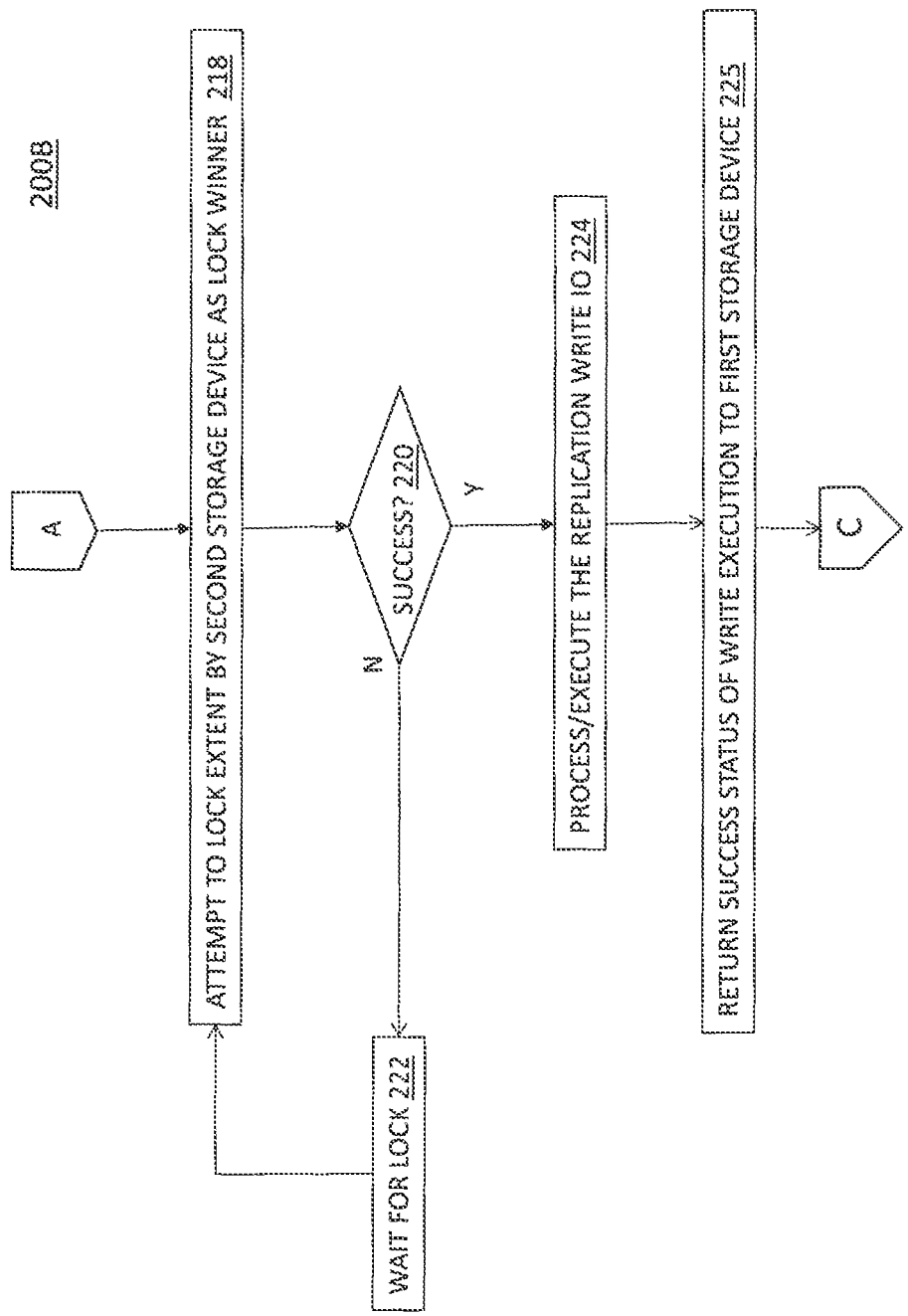

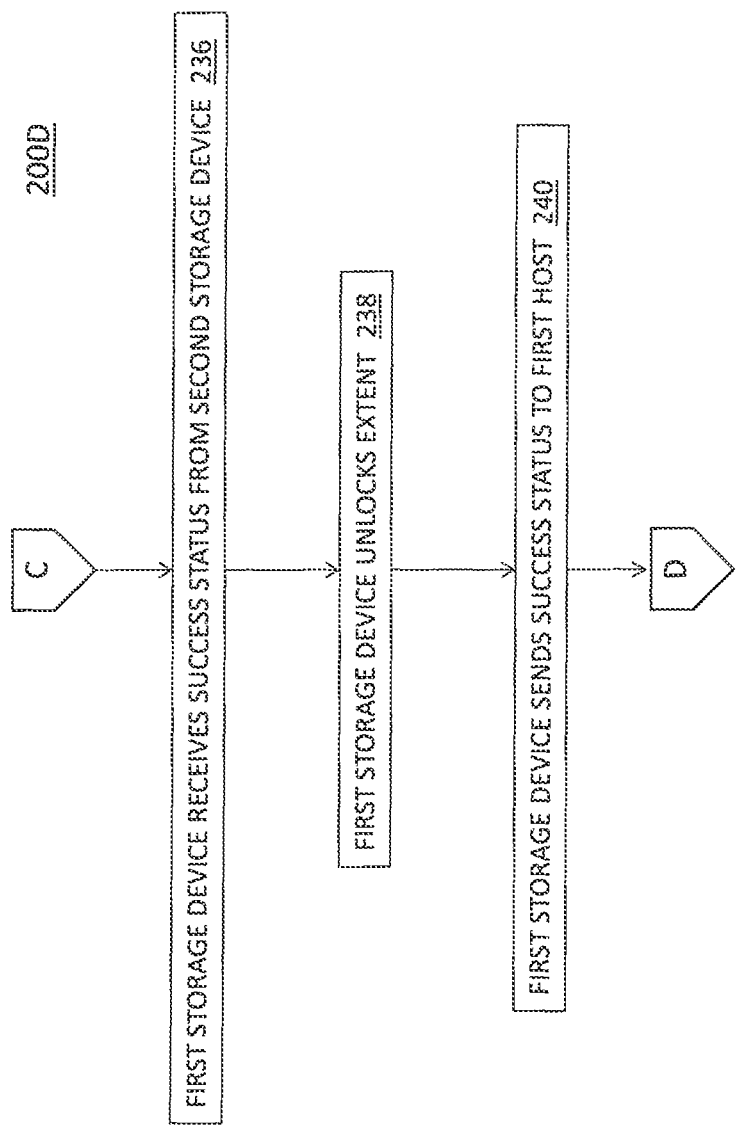

EXTENT LOCK RESOLUTION IN ACTIVE/ACTIVE REPLICATION

BACKGROUND

Data replication techniques enable organizations to protect data from loss, implement disaster recovery, or to migrate data between locations. There are various types of replication modes that can be utilized by an organization, and each mode comes with its own advantages and disadvantages. One popular mode of data replication is active/active replication in which a network of servers and applications concurrently perform input/output (TO) operations across a virtualized storage layer. This type of replication provides advantages such as continuous availability, as replication operations are not interrupted when one system or node in the network goes down.

However, an infrastructure that employs active/active replication requires some locking mechanism to enable concurrent updates to data from any site in the network. For example, if a host writes the first 4 KB of one page into one device and the last 4 KB of the same page into its peer device in an active/active setup, both sides will try to lock the page on both storage devices, leading to a deadlock.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for implementing extent lock resolution in an active/active replication session of a storage system. The method includes designating one of the storage devices as a lock winner. A lock winner designation indicates the one of the storage devices takes priority, over another of the storage devices, over acquisition of a lock. The method also includes receiving a replication write input/output (TO) request issued, by one of a first host system and a second host system during the active/active replication session, determining an extent of pages to be modified by the replication write TO request, locking the extent in one of the storage devices determined to be local to the host system that issued the replication write IO request, and executing the replication write IO request at the local storage device. The method further includes sending a write request to one of the storage devices remote from the host system that issued the replication write IO request, and receiving the write request at the storage device remote from the host system. If the remote storage device is the designated lock winner, and an attempt to lock the extent is unsuccessful, the remote storage device waits for the lock to become available. If the remote storage device is not the designated lock winner, and an attempt to lock the extent is unsuccessful, the remote storage device rejects the write request and sends a request to the local storage device to resend the write request.

Another aspect may provide a system for implementing extent lock resolution in an active/active replication session of a storage system. The system includes a memory having computer-executable instructions. The system also includes a processor operated by a storage system. The processor executes the computer-executable instructions. When executed by the processor, the computer-executable instructions cause the processor to perform operations. The operations include designating one of the storage devices as a lock winner. A lock winner designation indicates the one of the storage devices takes priority, over another of the storage devices, over acquisition of a lock. The operations also include receiving a replication write input/output (TO) request issued, by one of a first host system and a second host system during the active/active replication session, determining an extent of pages to be modified by the replication write IO request, locking the extent in one of the storage devices determined to be local to the host system that issued the replication write IO request, and executing the replication write IO request at the local storage device. The operations further include sending a write request to one of the storage devices remote from the host system that issued the replication write IO request, and receiving the write request at the storage device remote from the host system. If the remote storage device is the designated lock winner, and an attempt to lock the extent is unsuccessful, the remote storage device waits for the lock to become available. If the remote storage device is not the designated lock winner, and an attempt to lock the extent is unsuccessful, the remote storage device rejects the write request and sends a request to the local storage device to resend the write request.

Another aspect may provide a computer program product for implementing extent lock resolution in an active/active replication session of a storage system. The computer program is embodied on a non-transitory computer readable medium. The computer program product includes instructions that, when executed by a computer at a storage system, causes the computer to perform operations. The operations include designating one of the storage devices as a lock winner. A lock winner designation indicates the one of the storage devices takes priority, over another of the storage devices, over acquisition of a lock. The operations also include receiving a replication write input/output (TO) request issued, by one of a first host system and a second host system during the active/active replication session, determining an extent of pages to be modified by the replication write IO request, locking the extent in one of the storage devices determined to be local to the host system that issued the replication write IO request, and executing the replication write IO request at the local storage device. The operations further include sending a write request to one of the storage devices remote from the host system that issued the replication write IO request, and receiving the write request at the storage device remote from the host system. If the remote storage device is the designated lock winner, and an attempt to lock the extent is unsuccessful, the remote storage device waits for the lock to become available. If the remote storage device is not the designated lock winner, and an attempt to lock the extent is unsuccessful, the remote storage device rejects the write request and sends a request to the local storage device to resend the write request.

BRIEF DESCRIPTION OF THE DRAWINGS

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis

FIGS. 2A-2D are flow diagrams of processes for performing extent lock resolution in an active/active replication session of a storage system in accordance with an illustrative embodiment.

DETAILED DESCRIPTION

Figure 1:
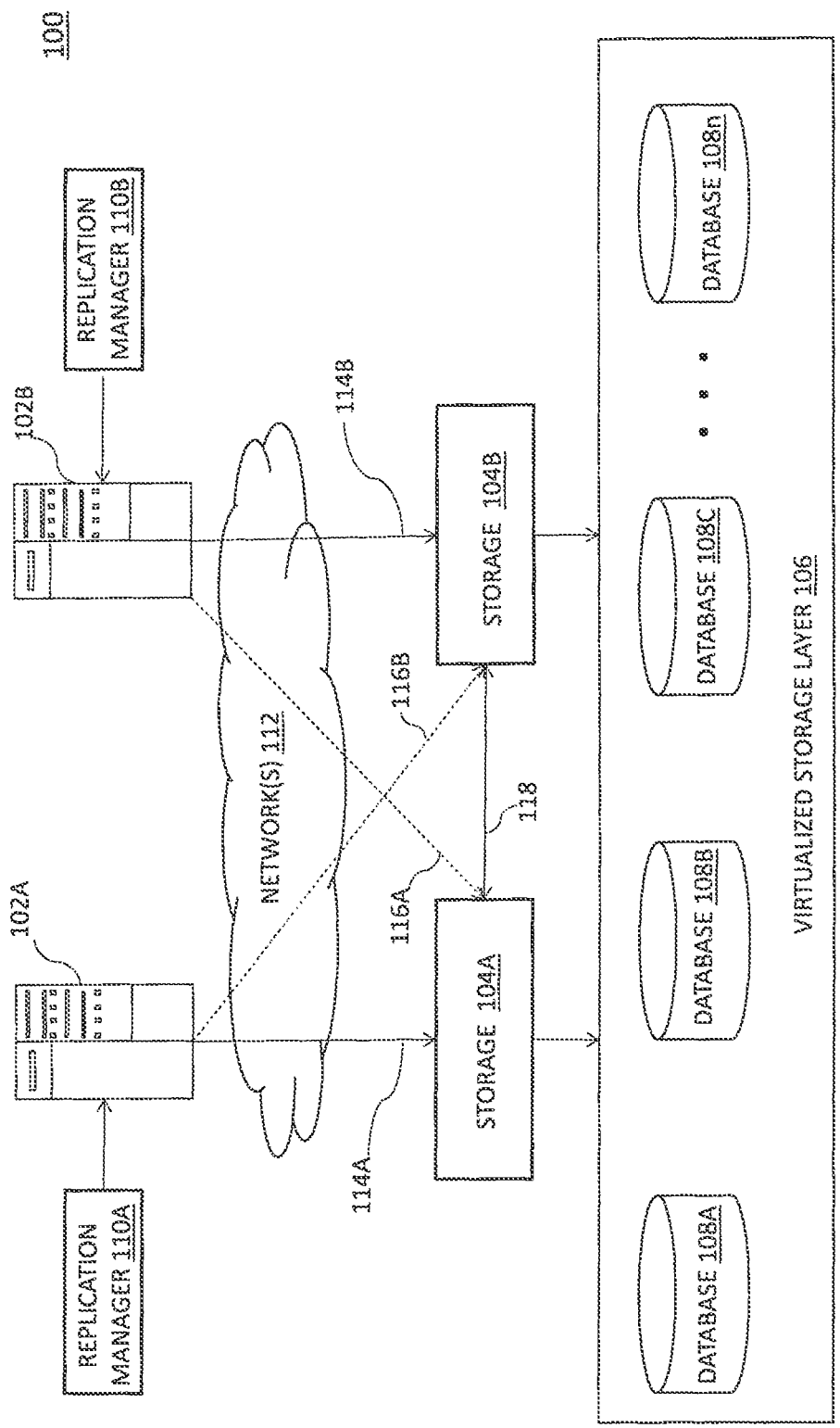
FIG. 1 is a block diagram of a storage system to perform extent lock resolution in an active/active replication session in accordance with an illustrative embodiment.

Embodiments described herein provide extent lock resolution in a storage system that performs active/active replication. As indicated above, active/active replication refers to a mode of data replication in which a network of servers and applications concurrently perform input/output (IO) operations across a virtualized storage layer. This type of replication mode can create challenges, e.g., where a deadlock situation ensues when both sides of a replication system attempt to lock the same page at the same time. Existing solutions for resolving this issue include techniques to obtain the lock on both sides of the system before processing the IO or to designate extent ownership on each side, moving the ownership as part of the active/active negotiations. However, this can not only be cumbersome but can also have a negative impact on overall system performance. The embodiments described herein provide a solution for extent lock situations by designating one side of the storage network as a lock winner, giving that side of the network priority over locks and lock handling when both sides of the network simultaneously attempt to lock the same page during the active/active session.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable and may also be referred to herein as a computer-readable program medium.

In certain embodiments, the term "I/O request" or simply "I/O" or "IO" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a snapshot may refer to differential representations of an image, i.e. the snapshot may have pointers to the original volume and may point to log volumes for changed locations. In certain embodiments, a snapshot may refer to differential representations of the state of a system. Snapshots may be combined into a snapshot array, which may represent different images over a time period or different states of a system over a time period.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a timestamp of the I/O.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, active/active replication refers to a mode of data replication in which a network of servers and applications concurrently perform input/output (IO) operations across a virtualized storage layer. This type of replication provides advantages such as continuous availability, as replication operations are not interrupted when one system or node in the network goes down.

In certain embodiments, an extent refers to a contiguous area of storage reserved for a file system that is represented as a range of blocks. For example, a file may consist of zero or more extents and one file fragment would require one extent.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

Turning now to FIG. 1, an example storage system 100 for performing extent lock resolution in an active/active replication session of a storage system will now be described. As indicated above, active/active replication refers to a mode of data replication in which a network of servers and applications concurrently perform input/output (IO) operations across a virtualized storage layer. This type of replication mode can create challenges, e.g., where a deadlock situation ensues when both sides of a replication system attempt to lock the same page at the same time. Existing solutions for resolving this issue include techniques to obtain the lock on both sides of the system before processing the IO or to designate extent ownership on each side, moving the ownership as part of the active/active negotiations; however, this can not only be cumbersome but can also have a negative impact on overall system performance.

The system 100 includes a first host system computer 102A and a second host system computer 102B. Each of the host system computers 102A and 102B is communicatively coupled to storage devices 104A and 104B over one or more networks 112. The host system computers 102A and 102B may be implemented as high-speed computer processing devices, such as one or more mainframe computers capable of handling a high volume of activities conducted on behalf of end users of the active/active replication session.

The storage devices 104A and 104B store a variety of data used by the host system computers 102A and 102B in implementing the active/active replication session. It is understood that the storage devices 104A and 104B may be implemented using memory contained in their respective host system computers 102A and 102B or may be separate physical devices. The storage devices 104A and 104B may be logically addressable as consolidated data sources across a distributed environment that includes the networks 112. The storage devices 104A-104B may communicate over a replication link 118 to perform replication write operations. For example, in embodiments, storage device 104A receives a write IO request from host system computer 102A and, once the write operation has been completed on the storage device 104A, the write IO is replicated to the storage device 104B over the replication link 118. It is understood that other means of communication between the storage devices 104A-104B may be employed, e.g., through one or more networks of networks 112.

The host system computers 102A-102B may operate as database servers and coordinate access to application data including data stored in the storage devices 104A and 104B. The host system computers 102A-102B may be implemented using one or more servers operating in response to a computer program stored in a storage medium accessible by the servers. The host system computers 102A-102B may each operate as a network server (e.g., a web server) to communicate with any network entities, such as storage systems 104A and 104B.

Storage devices 104A and 104B may be implemented as varying types of storage devices. For example, the storage devices 104A and 104B may include one or more rotating magnetic storage devices, one or more rotating optical storage devices, and/or one or more solid state drives (SSDs), such as a flash drive. The storage devices 104A and 104B may include one or more hard disk drives (HDD), one or more flash drives, optical disks, as well as one or more other types of data storage devices. In other examples, the storage devices 104A and 104B may include a set of one or more data storage arrays. A data storage array may be, for example, a redundant array of inexpensive disks (RAID) array, an optical storage array, or any other type of data storage array.

The networks 112 may be any type of known networks including, but not limited to, a storage area network (SAN), wide area network (WAN), a local area network (LAN), a global network (e.g. Internet), a virtual private network (VPN), and an intranet. The networks 112 may be implemented using wireless networks or any kind of physical network implementation known in the art, e.g., using cellular, satellite, and/or terrestrial network technologies. The networks 112 may also include short range wireless networks utilizing, e.g., BLUETOOTH™ and WI-FI™ technologies and protocols.

In some embodiments, host system computer 102A and storage device 104A reside in a first data center (not shown), and host system computer 102B and storage device 104B reside in a second data center. That is, host system computers 102A and 102B may reside in geographically disparate locations. In this embodiment, the host system computer 102A and the storage system 104A at the first data center are communicatively coupled through a local network (e.g., as shown by solid line 114A in FIG. 1), and the host system computer 102B and the storage system 104B may be communicatively coupled through a second local network (e.g., as shown by solid line 114B in FIG. 1). In some embodiments, the local communication networks 114A and 114B may include internal (e.g., short distance) communication links (e.g., InfiniBand (IB) link or Fibre Channel (FC) link) to transfer data between storage volumes for storing replicas (also referred to herein as snap sets).

In embodiments, the host system computer 102A at the first data center and the storage system 104B at the second data center may communicate remotely over a long distance network of the networks 112. Likewise, the host system computer 102B at the second data center and the storage system 104A at the first data center may communicate remotely over a long distance network of the networks 112. The long distance communication networks (shown in FIG. 1 as dotted lines 116A and 116B, respectively) may be long-distance communication networks of a storage area network (SAN), e.g., over an Ethernet or Internet (e.g., TCP/IP) link that may employ, for example, the iSC SI protocol.

Also shown in FIG. 1 is a virtualized storage layer 106 including virtual databases 108A-108n. The virtualized storage layer 106 represents a storage array virtualized across two or more physical sites to create a data presence mirrored between the sites and enables simultaneous writes to the two or more sites. The databases 108A-108n may reside in one or more of the storage devices 104A-104B. The virtualized storage layer 106 is communicatively coupled to the host systems 102A-102B through the storage devices 104A-104B via the networks 112.

In embodiments, as shown in FIG. 1, the host system computer 102A and the host system computer 102B each implements a replication manager application 110A and 110B, respectively, to manage the processes described herein. The host system computers 102A and 102B perform 10 operations on the storage devices 104A and 104B in an active/active replication session. In some embodiments, the IO operations for each of the host system computers 102A and 102B may be managed the respective replication manager applications 110A and 110B. As changes are made to data stored on storage devices 104A and 104B via the IO operations from the host system computers 102A and 102B, replication manager applications 110A and 110B perform data replication to their local storage systems and to remote storage systems over the networks 112 in an active/active replication mode.

Data replication may be performed based on data replication policies that may define various settings for data recovery operations. For example, one policy may define a plurality of attributes, such as a frequency with which replicas are generated and how long each replica is kept at a storage system. In some embodiments, a policy may define metrics for use in snap set creation and replication process determinations.

In embodiments, replication manager applications 110A and 110B, through the host systems 102A and 102B, are configured to enable designation of one of the storage devices to be a lock winner. In one embodiment, this designation can be determined by criteria such as a serial number of the storage devices. For example, the host systems 102A and 102B compare the serial numbers of their local storage devices 104A and 104B and, through their replication manager applications 110A and 110B, determine which serial number is higher. The storage device with the highest serial number is designated as the lock winner. This can be configured as an automated process that is performed by the replication manager applications or may be a manual process. In an embodiment, a user or administrator at one of the data centers can designate that the storage device residing at his/her data center become the lock winner. It will be understood that other means or criteria to designate a lock winner may be employed.

Turning now to FIG. 2A-2D, flow diagrams of processes 200A-200D for implementing extent lock resolution for storage devices in a storage system will now be described. The Figures assume that the system (e.g., system 100 of FIG. 1 and/or system 300 of FIG. 3) is performing replication in an active/active replication mode.

Figure 2A:
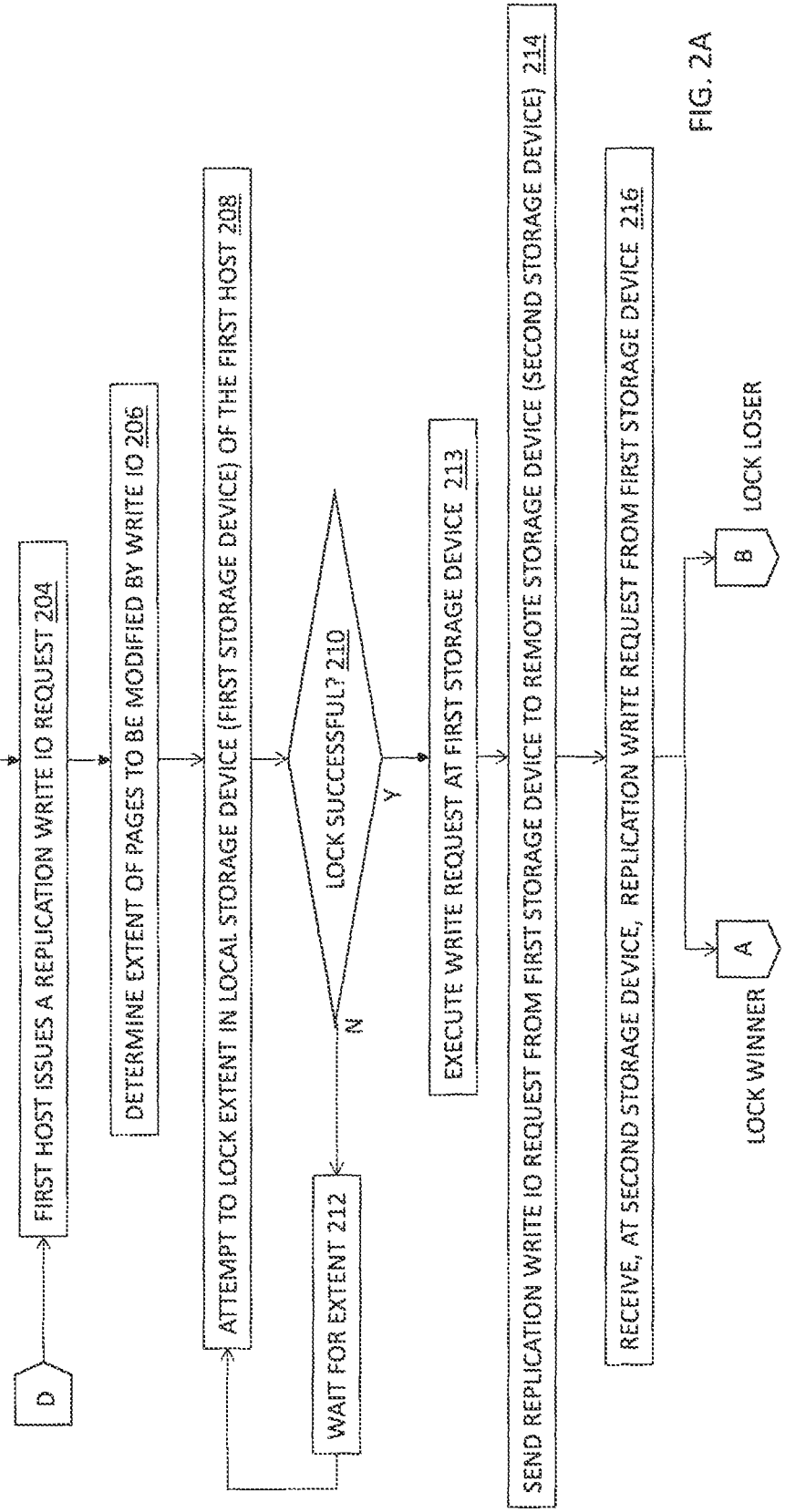

In block 202 of FIG. 2A, a one of the first storage device 104A and the second storage device 104B of the storage devices is designated as a lock winner. A lock winner designation indicates that the winning storage device will take priority, with respect to another storage device, over acquisition of a lock. As indicated above, this designation of lock winner may be implemented using different criteria. For example, the designation may be an automated function based on serial numbers of the storage devices. In this example, the storage device having the highest serial number is automatically designated as the lock winner. In another embodiment, the designation can be made by user selection. In either embodiment, the storage device designated as the lock winner is assigned an attribute by the system, such that the host systems 102A-102B implementing the active/active replication session can identify which storage system has been designated the lock winner.

In block 204, a replication write input/output (IO) request is issued by one of the host systems (e.g., 102A or 102B). In block 206, an extent of pages to be modified by the replication write IO request is identified.

In block 208, the process 200A attempts to lock the extent in the storage device that is local to the host system that issued the replication write IO request. For example, if host system 102A issued to the replication write IO request, then the process 200A attempts to lock the extent in storage device 104A, which is local to the host system 102A, regardless of which of the storage devices is designated winner or loser.

In block 210, it is determined whether the attempt to lock the extent was successful. The attempt may be unsuccessful if the extent is not available at the time of the lock attempt. In this case, if the extent is not available, the corresponding host system (to which the storage device is local) waits for the extent to become available in block 212, and the process 200A returns to block 208.

If the attempt to lock the extent is successful in block 210, the process 200A executes the write operation at the local storage device (e.g., 104A) in block 213, and sends a write request to the storage device that is remote from the host system that issued the replication write IO request (e.g., storage device 104B) in block 214. This write request is a replication write request from the first storage device 104A requesting that the write operation executed at the local storage device be replicated to the remote storage device. The write request includes the data subject to the replication write IO request and corresponding extent. Using the above example, the storage device remote from the host system 102A is storage device 104B. In block 216, the remote storage device (e.g., 104B) receives the write request from the local storage device.

Figure 2C:
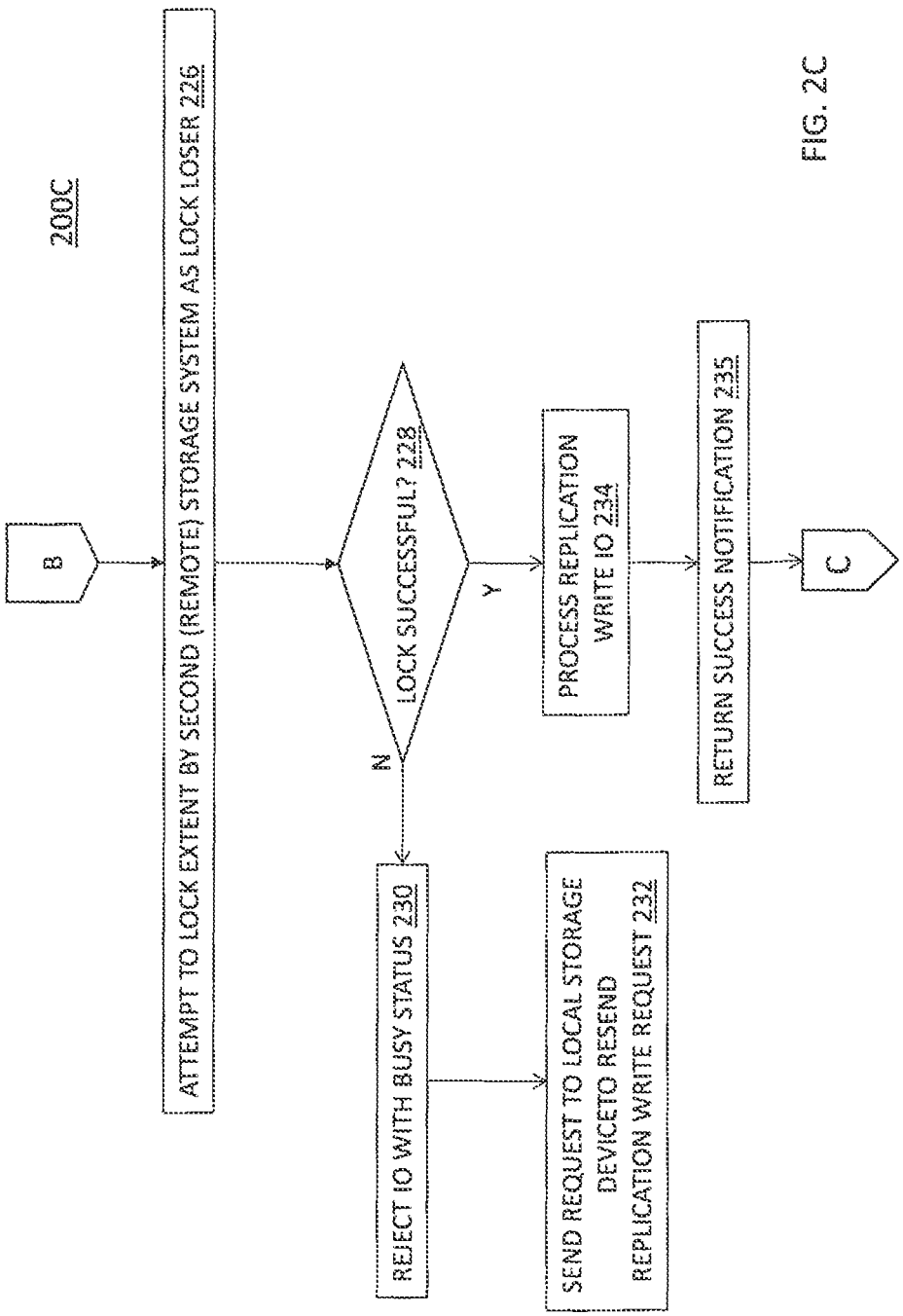

The process 200A continues to one of process 200B or 200C of FIGS. 2B and 2C, respectively, based on the perspective of the storage devices designated as either a lock winner or a lock loser. For example, if the remote storage device (e.g., 104B) is the designated lock winner, the process continues in FIG. 2B. If, however, the remote storage device is not the designated lock winner (i.e., lock loser), the process continues in FIG. 2C.

Turning now to FIG. 2B, the process 200B is performed from the perspective of the remote storage device as the lock winner. In block 218, the process 200B attempts to lock the extent by the storage device designated as the lock winner. For example, suppose storage device 104B has been designated the lock winner (from block 202). The storage device 104B attempts to lock the extent of pages to be modified by the write request in block 218.

In block 220, the process 200B determines whether the attempt in block 218 was successful. If the attempt is unsuccessful (e.g., the extent is not available or locked by another IO operation, the process 200B waits for the lock in block 222 and the process 200B returns to block 218.

Otherwise, if the attempt to lock the extent is successful in block 220, the replication write IO request is executed at the remote storage device and completed in block 224. The process 200B returns a success notification (e.g., that the replication write operation was executed at the remote storage device) to the local storage device in block 225, and the process 200B continues to FIG. 2D.

Returning now to FIG. 2A, if the remote storage device is the designated lock loser, the process 200A proceeds to FIG. 2C, and the process 200C is performed from the perspective of the lock loser. In FIG. 2C, an attempt to lock the extent by the remote storage system as the lock loser is performed in block 226.

In block 228, it is determined whether the lock is successful. If not, the remote storage device, as the lock loser, rejects the replication IO request with a busy status and returns and indicator to the local storage device in block 230. In block 232, the remote storage device sends a request to the local storage device to resend the replication write IO request.

Returning to block 228, if the attempt to lock the extent is successful, the replication write IO request is executed and completed (e.g., the data of the request is written to the remote storage device) in block 234, and a success notification is sent by the remote storage device to the local storage device in block 235. The process 200C proceeds to FIG. 2D.

In FIG. 2D, the process 200D begins with receipt of the success notifications (block 236) by the local storage device from the remote storage device (e.g., from blocks 225 and 235, respectively). In block 238, the local storage device unlocks the extent and in block 240, the local storage device sends a notification of successful completion to the host system that issued the replication write IO request. The process 200D returns to block 204 of FIG. 2A indicating another replication write IO request has been issued.

The processes 200A-200D can be continued in a loop until all replication write IO requests are processed in the session.

Figure 3:
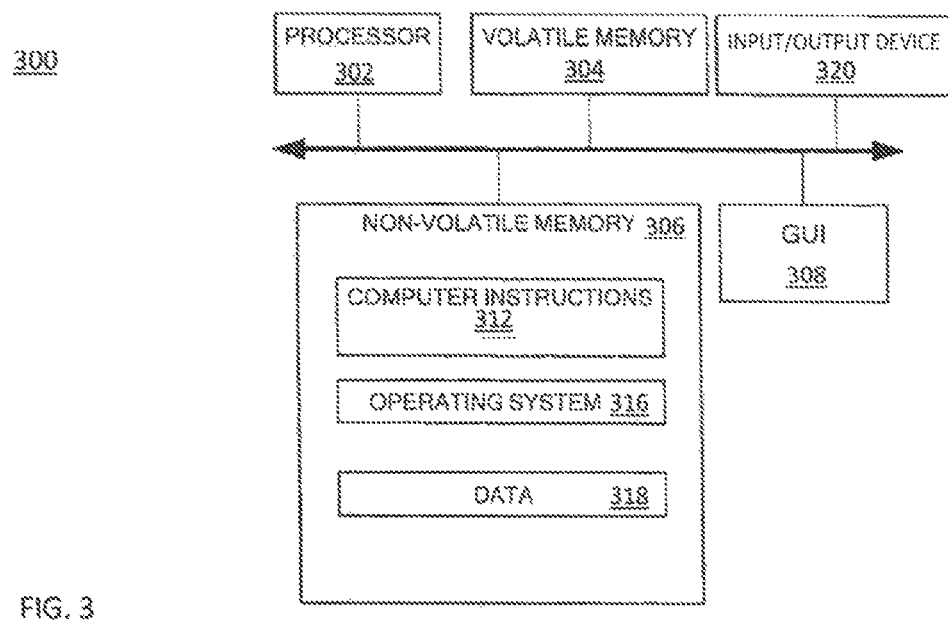
FIG. 3 is a block diagram of a hardware device that may perform at least a portion of the processes shown in FIGS. 2A-2D.

In some embodiments, the host system computers 102A-102B may be implemented as one or more computers, such as a computer 300 as shown in FIG. 3. Computer 300 may include processor 302, volatile memory 304 (e.g., RAM), non-volatile memory 306 (e.g., a hard disk drive, solid state drive such as a flash drive, a hybrid magnetic and solid state drive, etc.), graphical user interface (GUI) 308 (e.g., a mouse, a keyboard, a display, and so forth) and input/output (I/O) device 320. Non-volatile memory 306 stores computer instructions 312, an operating system 316 and data 318 such that, for example, the computer instructions 312 are executed by the processor 302 out of volatile memory 304 to perform at least a portion of the processes 200A-200D shown in FIGS. 2A-2D. Program code may be applied to data entered using an input device of GUI 308 or received from I/O device 320.

Processes 200A-200D shown in FIGS. 2A-2D are not limited to use with the hardware and software of FIG. 3 and may find applicability in any computing or processing environment and with any type of machine or set of machines that is capable of running a computer program. Processes 200A-200D may be implemented in hardware, software, or a combination of the two.

The processes described herein are not limited to the specific embodiments described. For example, processes 200A-200D are not limited to the specific processing order shown in FIGS. 2A-2D. Rather, one or more blocks of processes 200A-200D may be re-ordered, combined or removed, performed in parallel or in serial, as necessary, to achieve the results set forth herein.

Processor 302 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general-purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

In the above-described flow charts of FIG. 2A-2D, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagram does not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Figure 4:
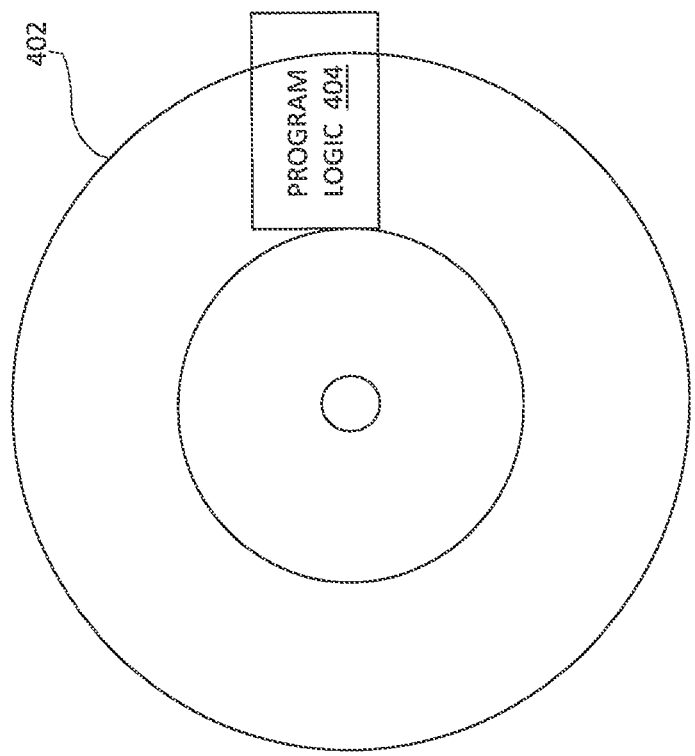
FIG. 4 is a simplified block diagram of an apparatus that may be used to implement at least a portion of the systems of FIGS. 1 and 3 and at least a portion of the process of FIGS. 2A-2D.

For example, when the program code is loaded into and executed by a machine, such as the computer of FIG. 3, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 4 shows Program Logic 404 embodied on a computer-readable medium 402 as shown, and wherein the Logic is encoded in computer-executable code configured for carrying out the reservation service process of this invention and thereby forming a Computer Program Product 400. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method for providing extent lock resolution for storage devices in an active/active replication session, the method comprising:

designating a one of the storage devices as a lock winner, a lock winner designation indicating the one of the storage devices takes priority, over another storage device of the storage devices, over acquisition of a lock;

receiving a replication write input/output (IO) request issued, by one of a first host system and a second host system during the active/active replication session;
determining an extent of pages to be modified by the replication write IO request;
locking the extent in one of the storage devices determined to be local to the host system that issued the replication write IO request, and executing the replication write IO request at the local storage device;
sending a write request to one of the storage devices remote from the host system that issued the replication write IO request;
receiving the write request at the storage device remote from the host system;
if the remote storage device is the designated lock winner, and an attempt to lock the extent is unsuccessful, waiting for the lock to become available; and
if the remote storage device is not the designated lock winner, and an attempt to lock the extent is unsuccessful, rejecting the write request and sending a request to the local storage device to resend the write request.

2. The method of claim 1, wherein locking the extent in one of the storage devices determined to be local to the host system comprises:
determining whether the extent is already locked by another write IO operation; and
upon determining the extent is already locked, waiting for the extent to become available.

3. The method of claim 1, wherein sending a write request to one of the storage devices remote from the host system that issued the replication write IO request includes sending data subject to the replication write IO request and corresponding extent.

4. The method of claim 1, further comprising:
attempting to lock the extent by the remote storage device as the lock winner;
determining whether the extent is already locked by another write IO operation; and
upon determining the extent is not locked, executing the replication write IO request at the remote storage device.

5. The method of claim 1, wherein rejecting the replication write IO request, by the second storage device as a lock loser, includes rejecting the write request with a busy status.

6. The method of claim 1, wherein designating the one of the storage devices as the lock winner is determined by serial numbers assigned to the storage devices, and wherein a storage device having a highest serial number is designated the lock winner.

7. The method of claim 6, further comprising assigning an attribute to the storage device designated as the lock winner wherein a storage system implementing the active/active replication session identifies the storage device designated as the lock winner via the assigned attribute.

8. A system for providing extent lock resolution for storage devices in an active/active replication session, the system comprising:
a memory comprising computer-executable instructions; and
a processor executing the computer-executable instructions, the computer-executable instructions when executed by the processor cause the processor to perform operations comprising:
designating a one of the storage devices as a lock winner, lock winner designation indicating the one of the storage devices takes priority, over another storage device of the storage devices, over acquisition of a lock;
receiving a replication write input/output (IO) request issued, by one of a first host system and a second host system during the active/active replication session;
determining an extent of pages to be modified by the replication write IO request;
locking the extent in one of the storage devices determined to be local to the host system that issued the replication write IO request, and executing the replication write IO request at the local storage device;
sending a write request to one of the storage devices remote from the host system that issued the replication write IO request;
receiving the write request at the storage device remote from the host system;
if the remote storage device is the designated lock winner, and an attempt to lock the extent is unsuccessful, waiting for the lock to become available; and
if the remote storage device is not the designated lock winner, and an attempt to lock the extent is unsuccessful, rejecting the write request and sending a request to the local storage device to resend the write request.

9. The system of claim 8, wherein locking the extent in one of the storage devices determined to be local to the host system comprises:
determining whether the extent is already locked by another write IO operation; and
upon determining the extent is already locked, waiting for the extent to become available.

10. The system of claim 8, wherein sending a write request to one of the storage devices remote from the host system that issued the replication write IO request includes sending data subject to the replication write IO request and corresponding extent.

11. The system of claim 8, wherein the operations further comprise:
attempting to lock the extent by the remote storage device as the lock winner;
determining whether the extent is already locked by another write IO operation; and
upon determining the extent is not locked, executing the replication write IO at the remote storage device.

12. The system of claim 8, wherein rejecting the replication write IO request, by the second storage device as a lock loser, includes rejecting the write request with a busy status.

13. The system of claim 8, wherein designating the one of the storage devices as the lock winner is determined by serial numbers assigned to the storage devices, and wherein a storage device having a highest serial number is designated the lock winner, wherein the operations further comprise:
assigning an attribute to the storage device designated as the lock winner, wherein a storage system implementing the active/active replication session identifies the storage device designated as the lock winner via the assigned attribute.

14. A computer program product for providing extent lock resolution for storage devices in an active/active replication session, the computer program product embodied on a non-transitory computer readable medium and including instructions that, when executed by a computer causes the computer to perform operations comprising:
designating one of the storage devices as a lock winner, a lock winner designation indicating the one of the storage devices takes priority, over another of the storage device, over acquisition of a lock;

receiving a replication write input/output (IO) request issued, by one of a first host system and a second host system during the active/active replication session;

determining an extent of pages to be modified by the replication write IO request;

locking the extent in one of the storage devices determined to be local to the host system that issued the replication write IO request, and executing the replication write IO request at the local storage device;

sending a write request to one of the storage devices remote from the host system that issued the replication write IO request;

receiving the write request at the storage device remote from the host system;

if the remote storage device is the designated lock winner, and an attempt to lock the extent is unsuccessful, waiting for the lock to become available; and if the remote storage device is not the designated lock winner, and an attempt to lock the extent is unsuccessful, rejecting the write request and sending a request to the local storage device to resend the write request.

15. The computer program product of claim 14, wherein locking the extent in one of the storage devices determined to be local to the host system comprises:

determining whether the extent is already locked by another write IO operation; and upon determining the extent is already locked, waiting for the extent to become available.

16. The computer program product of claim 14, wherein sending a write request to one of the storage devices remote from the host system that issued the replication write IO request includes sending data subject to the replication write IO request and corresponding extent.

17. The computer program product of claim 14, wherein the operations further comprise:

attempting to lock the extent, by the remote storage device as the lock winner;

determining whether the extent is already locked by another write IO operation; and upon determining the extent is not locked, executing the replication write IO at the remote storage device.

18. The computer program product of claim 14, wherein rejecting the replication write IO request, by the second storage device as a lock loser, includes rejecting the write request with a busy status.

19. The computer program product of claim 14, wherein designating the one of the storage devices as the lock winner is determined by serial numbers assigned to the storage devices, and wherein a storage device having a highest serial number is designated the lock winner.

20. The computer program product of claim 19, wherein the operation further comprise assigning an attribute to the storage device designated as the lock winner, wherein a storage system implementing the active/active replication session identifies the storage device designated as the lock winner via the assigned attribute.

* * * * *